US009744658B2

(12) United States Patent
Simeone et al.

(10) Patent No.: US 9,744,658 B2
(45) Date of Patent: Aug. 29, 2017

(54) POWER TOOL OPERATION RECORDING AND PLAYBACK

(71) Applicant: Milwaukee Electric Tool Corporation, Brookfield, WI (US)

(72) Inventors: Thomas G. Simeone, Milwaukee, WI (US); Matthew J. Mergener, Germantown, WI (US); Matthew Wycklendt, Delafield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 607 days.

(21) Appl. No.: 14/213,098

(22) Filed: Mar. 14, 2014

(65) Prior Publication Data

US 2014/0262389 A1 Sep. 18, 2014

Related U.S. Application Data

(60) Provisional application No. 61/788,510, filed on Mar. 15, 2013.

(51) Int. Cl.
*B25F 5/00* (2006.01)
*B23B 45/02* (2006.01)
(Continued)

(52) U.S. Cl.
CPC .............. *B25F 5/00* (2013.01); *B23B 45/02* (2013.01); *B25B 21/00* (2013.01)

(58) Field of Classification Search
CPC .. B23Q 5/10; B25B 21/00; B25F 5/00; B23B 45/02
(Continued)

(56) References Cited

U.S. PATENT DOCUMENTS

| 5,563,482 A | 10/1996 | Shaw et al. |
| 6,495,983 B1 | 12/2002 | Stern |

(Continued)

FOREIGN PATENT DOCUMENTS

| CH | 393489 | 6/1965 |
| CN | 102844155 | 12/2012 |

(Continued)

OTHER PUBLICATIONS

International Search Report and Written Opinion for Application No. PCT/US2014/028721 dated Jul. 21, 2014 (16 pages).
(Continued)

*Primary Examiner* — Gloria R Weeks
*Assistant Examiner* — William A Weller
(74) *Attorney, Agent, or Firm* — Michael Best & Friedrich LLP

(57) ABSTRACT

A power tool and method for recording and playing back a motor parameter. The power tool includes housing, a motor, a trigger, a mode selector switch, and a controller. The trigger outputs an activation signal based on a user input. The mode selector switch is configured to receive a user mode selection indicating a recording mode, a normal operating mode, or a playback mode. The controller receives a mode selection signal from the mode selector switch indicating the selected mode. The controller enters the recording mode when the user mode selection indicates the recording mode, and records a motor parameter while the power tool is in the recording mode to generate a recorded motor parameter. In the playback mode, the controller operates the motor based on the recorded motor parameter upon receiving the activation signal from the trigger.

18 Claims, 16 Drawing Sheets

(51) Int. Cl.
B25B 21/00 (2006.01)
B23Q 5/10 (2006.01)

(58) Field of Classification Search
USPC .................................................. 173/1, 47, 48
See application file for complete search history.

(56) References Cited

U.S. PATENT DOCUMENTS

| | | | |
|---|---|---|---|
| 6,834,730 B2 | 12/2004 | Gass et al. | |
| 6,868,571 B1 * | 3/2005 | Fischer | B25H 7/04 |
| | | | 33/760 |
| 7,239,944 B2 | 7/2007 | Dean | |
| 7,613,590 B2 | 11/2009 | Brown | |
| 7,932,695 B2 * | 4/2011 | Uehlein-Proctor | H02J 7/0045 |
| | | | 320/113 |
| 8,179,069 B2 | 5/2012 | Matsunaga et al. | |
| 8,286,723 B2 | 10/2012 | Puzio et al. | |
| 2002/0060082 A1 | 5/2002 | Watanabe | |
| 2005/0045354 A1 | 3/2005 | Arimura et al. | |
| 2007/0000676 A1 | 1/2007 | Arimura | |
| 2008/0257577 A1 | 10/2008 | Tanaka et al. | |
| 2010/0268521 A1 | 10/2010 | Heller et al. | |
| 2011/0186318 A1 | 8/2011 | Ichikawa | |
| 2011/0214894 A1 * | 9/2011 | Harada | B25B 21/02 |
| | | | 173/181 |
| 2012/0169256 A1 | 7/2012 | Suda et al. | |
| 2012/0318545 A1 | 12/2012 | Schreiber | |
| 2013/0006399 A1 | 1/2013 | Tandon et al. | |
| 2013/0058711 A1 | 3/2013 | Van Der Linde et al. | |
| 2013/0187587 A1 | 7/2013 | Knight et al. | |
| 2014/0069672 A1 * | 3/2014 | Mashiko | B25B 21/00 |
| | | | 173/47 |
| 2017/0083014 A1 * | 3/2017 | Conrad | G05B 19/425 |

FOREIGN PATENT DOCUMENTS

| | | | | |
|---|---|---|---|---|
| JP | 2003311653 | | 11/2003 | |
| WO | WO2012160799 | * | 11/2012 | ................ B25F 5/00 |

OTHER PUBLICATIONS

European Search Report for Application No. 14764096.5 dated Oct. 11, 2016 (9 pages).
Chinese Patent Office Action for Application No. 201480014135.1 dated Jun. 3, 2016 with English translation (13 pages).
Chinese Patent Office Action and Search Report for Application No. 201480014135.1 with English Translation dated Feb. 27, 2017 (13 pages).

* cited by examiner

POWER TOOL OPERATION RECORDING AND PLAYBACK

RELATED APPLICATIONS

The present application claims priority to U.S. Provisional Patent Application No. 61/788,510, filed on Mar. 15, 2013.

FIELD OF THE INVENTION

The present invention relates generally to power tools, such as power drills or impact drivers.

SUMMARY

In one embodiment, the invention provides a power tool including a tool housing defining a cavity, a motor positioned within the cavity, a trigger, a mode selector switch, and a controller. The trigger is coupled to the tool housing and configured to output an activation signal based on a user input. The mode selector switch is configured to receive a user mode selection, which indicates an operating mode selected from the group of a recording mode, a normal operating mode, and a playback mode. The controller is coupled to the trigger, the mode selector switch, and the motor. The controller is configured to receive a mode selection signal from the mode selector switch that is indicative of the user mode selection for the power tool. The controller is further configured to enter the recording mode when the user mode selection indicates the recording mode, and to record a motor parameter while the power tool is in the recording mode and the motor is operating to generate a recorded motor parameter. The controller is further configured to enter the playback mode when the user mode selection indicates the playback mode, and to operate the motor based on the recorded motor parameter upon receiving the activation signal from the trigger while the power tool is in the playback mode.

In another embodiment, the invention provides a method of operating a power tool including a motor, a mode selector switch, a trigger, and a controller. The method includes receiving, by the mode selector switch, a user mode selection indicating an operating mode for the power tool. The operating mode is selected from the group of a recording mode, a playback mode, and a normal operating mode. The method further includes entering, by the controller, the recording mode when the user mode selection indicates the recording mode, and recording, by the controller, a motor parameter while the power tool is in the recording mode and the motor is operating to generate a recorded motor parameter. The method further includes entering, by the controller, the playback mode when the user mode selection indicates the playback mode, and receiving, by the controller, an activation signal from the trigger. The method further includes executing, by the controller, the recorded motor parameter to operate the motor based on the recorded motor parameter upon receipt of the activation signal while the power tool is in the playback mode.

Other aspects of the invention will become apparent by consideration of the detailed description and accompanying drawings.

DETAILED DESCRIPTION

Figure 1:
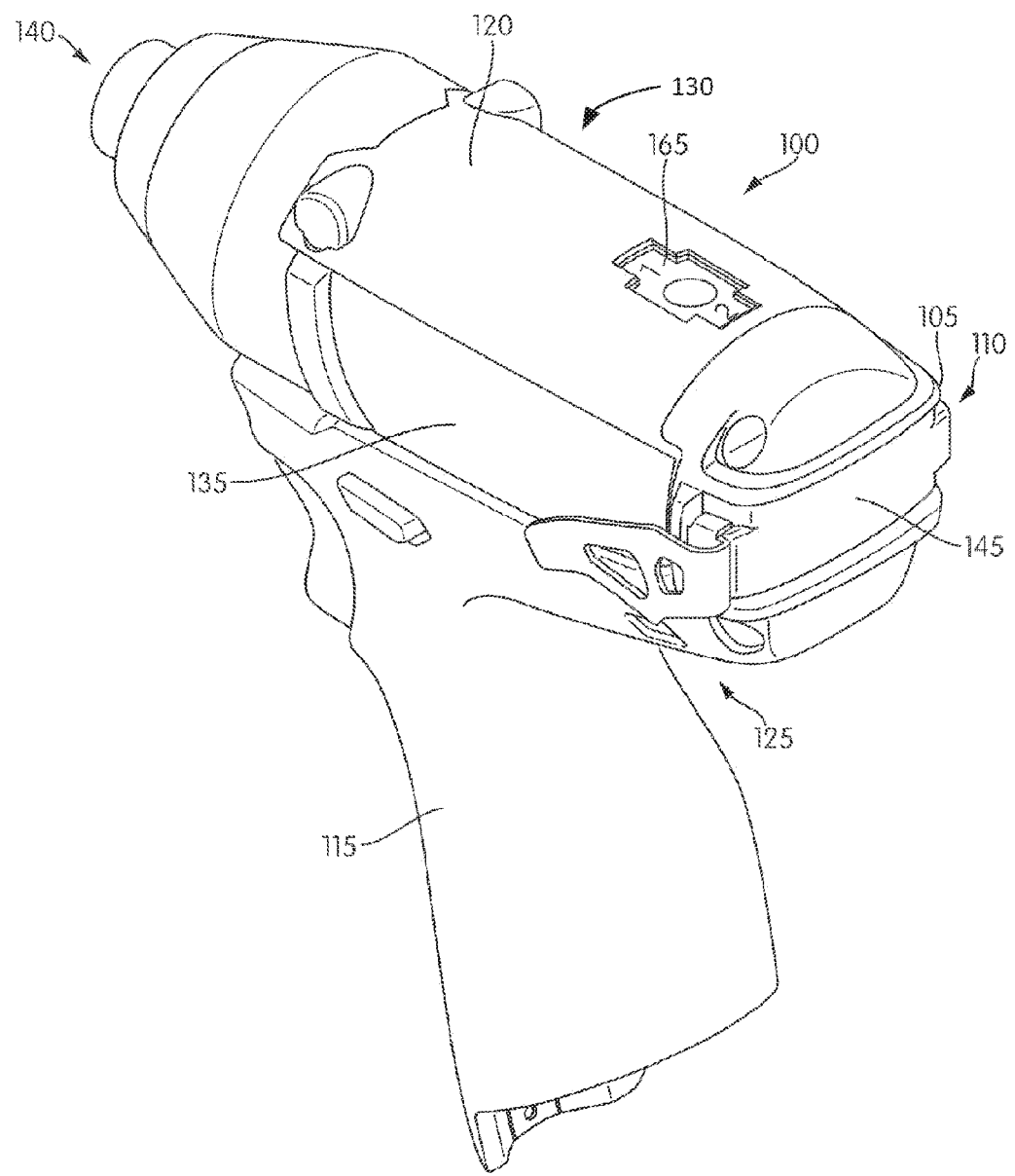
FIG. 1 is a perspective view of a tool according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one embodiment, the invention provides a power tool that includes a tool housing defining a cavity and a pocket formed in a wall of the tool housing. A motor is positioned within the cavity, and a trigger mechanism is moveably coupled to the tool housing. A mode selector switch is positioned within the pocket, the mode selector switch including a plurality of speed indicators and a push-button operable to receive a user mode selection. The mode selector switch is operable to allow the power tool to be operated in one of a recording mode, a playback mode, and a normal operating mode based on the user mode selection, and the speed indicators indicate the user mode selection. The power tool further includes a controller operable to receive the user mode signal from the speed selector switch, the user mode signal indicative of a selected user mode, receive an activation signal from the trigger switch, record operation of a motor or other parameter during the recording mode upon receiving the activation signal, operate the motor during the playback mode based on the recorded motor operation upon receiving the activation signal, or operate the motor according to the activation signal during the normal operating mode. While the embodiments described hereinbelow refer to motor parameter recording, embodiments of the invention contemplate the recording and playback of other operating parameters as well that result from activation of the trigger, and references to "motor parameter" are not intended to be limiting to only parameters directly related to operation of the motor.

In another embodiment, the invention provides a power tool including a tool housing defining a cavity, a motor positioned within the cavity, and a trigger mechanism moveably coupled to the tool housing. A usage mode selector switch is coupled to the tool housing, and the tool includes a plurality of usage mode indicators. The usage mode selector switch is operable to receive a usage mode selection selecting one of a recording mode, a playback mode, and a normal use mode. The usage mode selector switch is operable to output a usage mode signal based on the usage mode selection, and the usage mode indicators indicate the usage mode selection. The power tool also includes a controller operable to receive the usage mode signal from the usage mode selector switch, the usage mode signal indicative of a selected usage mode. The controller receives an activation signal from the trigger switch, records an operation of the motor during the recording mode upon receiving the activation signal, plays back a recorded operation of the motor during the playback mode upon receiving the activation signal, and operates the motor according to the activation signal during the normal use mode.

Figure 2:
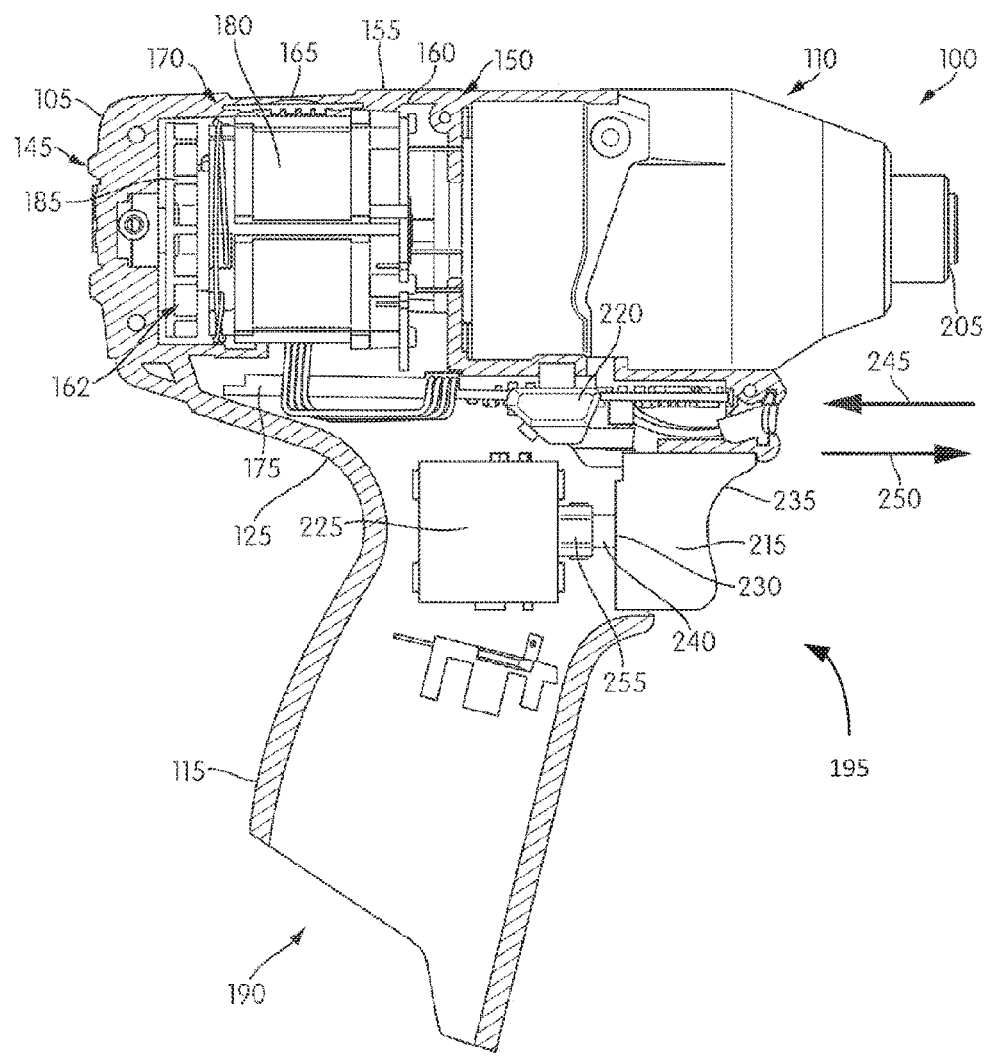
FIG. 2 is a side view of the tool shown in FIG. 1 with a portion of a tool housing removed.

FIG. 1 is a perspective view of a power tool 100 (e.g., a power drill, an impact driver, a power saw, an angle driver, etc.). The tool 100 includes a tool housing 105 defining a body portion 110 and a handle 115. The body portion 110 of the tool housing 105 includes a top surface 120, a bottom surface 125, side surfaces 130, 135, a front surface 140, and a rear surface 145. FIG. 2 illustrates the tool 100 with a portion of the tool housing 105 removed. The tool housing 105 further includes a wall 150 defining an exterior surface 155 and an interior surface 160 of the housing 105. The interior surface 160 defines a cavity 162 within the body portion 110.

In one embodiment, a user mode selector switch 165 is disposed between the exterior surface 155 and the interior surface 160 of the wall 150 and within a pocket 170 defined by the wall 150. In the illustrated embodiment, the pocket 170 is located proximately to the cavity 162, and the user mode selector switch 165 is accessible from the top surface 120 of the housing 105. In other embodiments, the user mode selector switch 165 is accessible via another surface of the housing, such as one of the side surfaces 130, 135 or the rear surface 145. A printed circuit board (PCB) 175 and a motor 180 are located within the cavity 162 of the body portion 110. The motor 180 is coupled to the interior surface 160 via a motor mount 185.

In the illustrated embodiment, the handle 115 extends downwardly from the bottom surface 125 of the body portion 110 such that the tool 100 has a pistol-style grip. A battery receptacle 190 is located at a distal end of the handle 115, and a trigger mechanism 195 is positioned on the handle 115 proximate the body portion 110. In an alternative embodiment, the user mode selector switch 165 may be accessible via a surface of the handle 115 such as a position below trigger mechanism 195 and adjacent to the battery receptacle 190.

The PCB 175 is electrically coupled to the motor 180 and includes electrical and electronic components that are operable to control the tool 100. In the illustrated embodiment, the PCB 175 includes a controller 200 (FIG. 8) for controlling operation of the tool 100.

The motor 180 is a multi-speed, brushless direct-current (BLDC) motor. As is commonly known, BLDC motors include a stator, a permanent magnet rotor, and an electronic commutator. The electronic commutator typically includes, among other things, a programmable device (e.g., a microcontroller, a digital signal processor, or a similar controller) having a processor and a memory. The programmable device of the BLDC motor uses software stored in the memory to control the electric commutator. The electric commutator then provides the appropriate electrical energy to the stator in order to rotate the permanent magnet rotor at a desired speed. In some embodiments, the controller 200 acts as the programmable device of the motor 180. In other embodiments, the programmable device is separate from the controller 200. In other embodiments of the motor 180, the motor 180 can be a variety of other types of multi-speed or variable-speed motors, including but not limited to, a brush direct-current motor, a stepper motor, a synchronous motor, an induction motor, a vector-driven motor, a switched reluctance motor, and other DC or AC motors. The motor 180 is used to drive a working element 205 (FIG. 2). In the illustrated embodiment, the working element 205 is located on the front surface 140 of the body portion 110. In the illustrated embodiment the working element 205 is a drill chuck, but other types of tools, such as angle grinders, saws, etc., will use different working elements.

The battery receptacle 190 receives a battery 210 (FIG. 8), which provides power to the tool 100. In some embodiments, the battery 210 is a rechargeable lithium-ion battery. In other embodiments, the battery 210 may have a chemistry other than lithium-ion such as, for example, nickel cadmium, nickel metal-hydride, etc. Additionally or alternatively, the battery 210 may be a non-rechargeable battery. In some embodiments, the battery 210 is a power tool battery including a pack housing containing one or more battery cells and a latching mechanism for selectively securing the battery 210 to the battery receptacle 190. In another embodiment, the battery 210 is mounted externally to the handle 115. In another embodiment, the battery 210 is mounted below the handle 115. In another embodiment, an electrical cord provides power to the tool 100.

Referring to FIG. 2, the trigger mechanism 195 includes a trigger 215, a direction switch 220, and an electrical switch 225. In the illustrated embodiment, the trigger 215 extends partially down a length of the handle 115; however, in other embodiments the trigger 215 extends down the entire length of the handle 115 or may be positioned elsewhere on the tool 100. The trigger 215 is moveably coupled to the handle 115 such that the trigger 215 moves with respect to the tool housing 105. The trigger 215 includes an interior portion 230 and an exterior portion 235, which is accessible to the user. The interior portion 230 is coupled to a push rod 240, which is engageable with the electrical switch 225. The exterior portion 235 of the trigger 215 moves in a first direction 245 towards the handle 115, when the trigger 215 is depressed by the user. The exterior portion 235 moves in a second direction 250, away from the handle 115, when the trigger 215 is released by the user. When the trigger 215 is depressed by the user, the push rod 240 activates the electrical switch 225, and when the trigger 215 is released by the user, the electrical switch 225 is deactivated.

In the illustrated embodiment, the electrical switch 225 is a push-button electrical switch positioned within the handle 115. The electrical switch 225 includes a push button 255 and electrical contacts. When the push button 255 is activated, such as by the push rod 240, the electrical contacts are in a CLOSED position. When the electrical contacts are in the CLOSED position, electrical current is supplied from the battery to the motor 180, via the controller 200. When the push button 255 is not activated, the electrical contacts are in the OPEN position. When the electrical contacts are in the OPEN position, electrical current is not supplied from the battery to the motor 180. Although the electrical switch 225 is illustrated as a push-button electrical switch with contacts, other types of electrical switches may be used with the tool 100.

Figure 3:
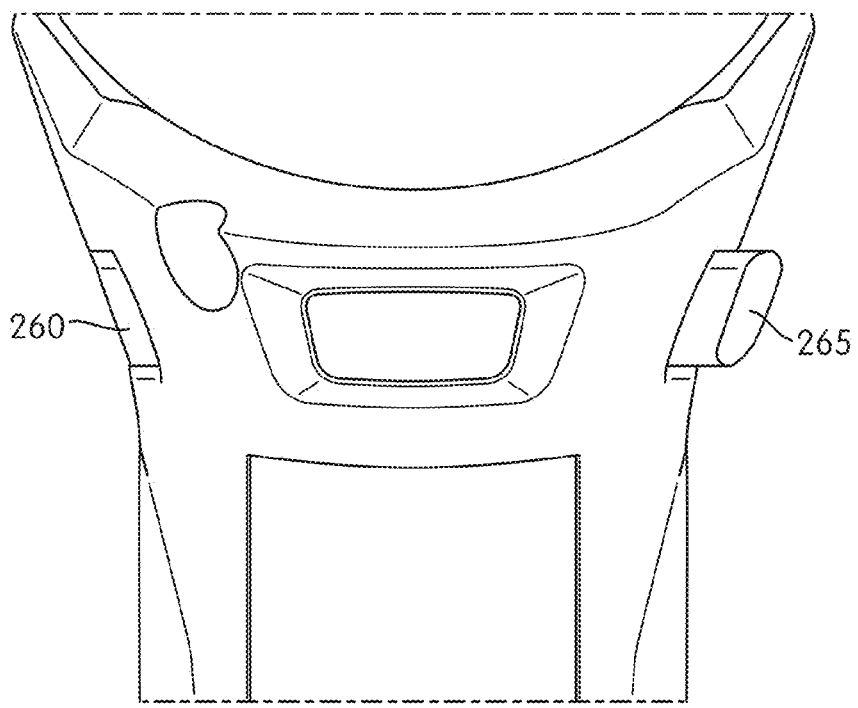
FIG. 3 illustrates a direction switch of the tool shown in FIG. 1 in a FORWARD position.
Figure 4:
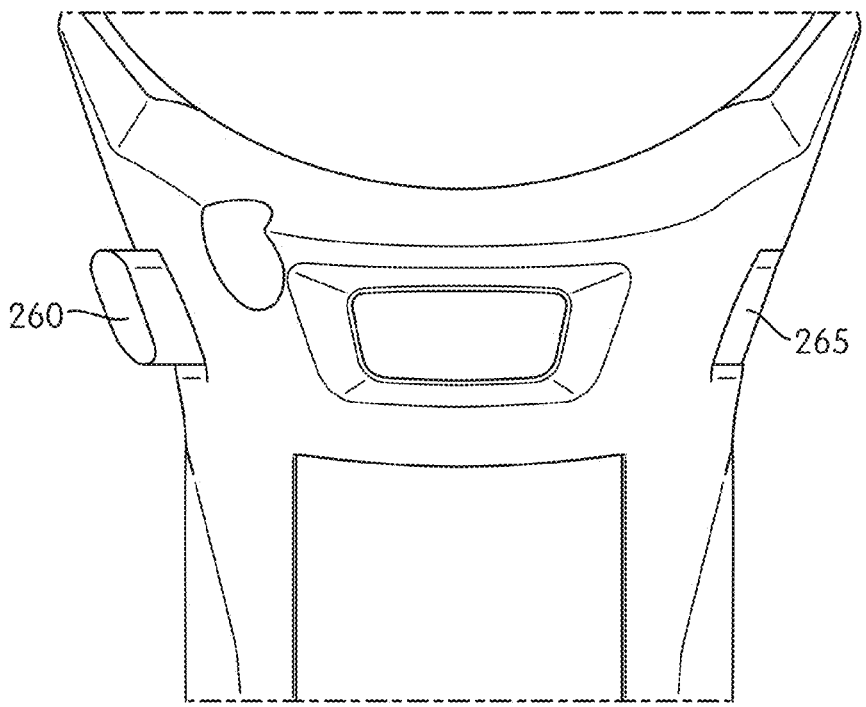
FIG. 4 illustrates the direction switch of the tool shown in FIG. 1 in a REVERSE position.
Figure 5:
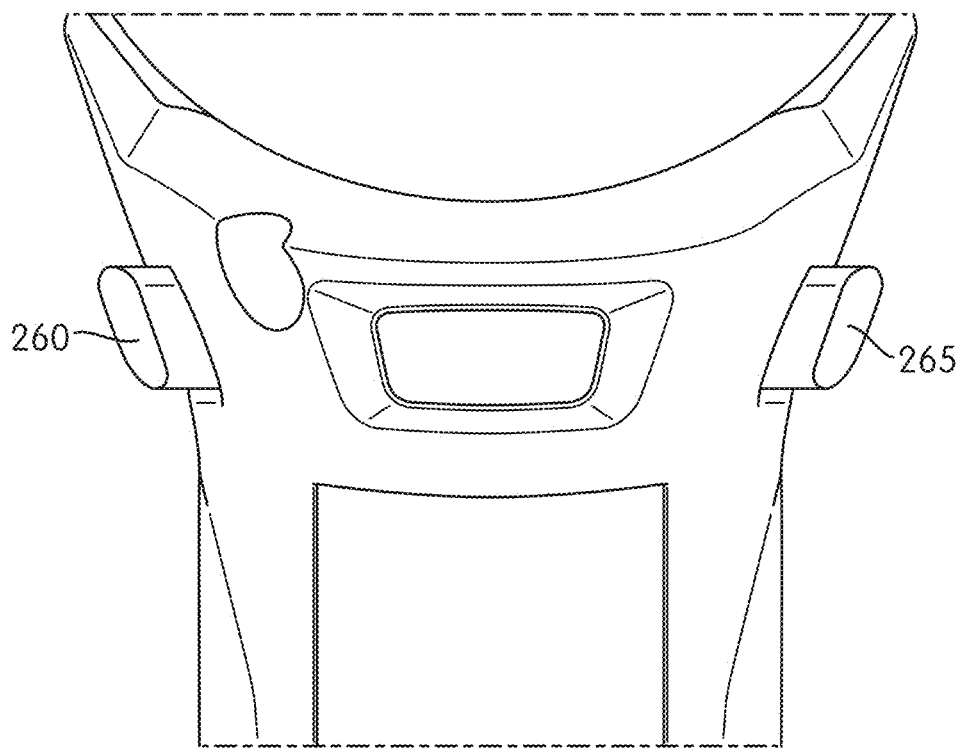
FIG. 5 illustrates the direction switch of the tool shown in FIG. 1 in a NEUTRAL position.

The direction switch 220 is located above the trigger 215 and below the body portion 110 of the tool 100. The direction switch 220 is slidingly coupled to the handle 115. As shown in FIGS. 3-5, the direction switch 220 includes a first side 260 and a second side 265. The direction switch 220 controls the directional mode of operation of the motor 180 (e.g., FORWARD, REVERSE, and NEUTRAL) by sending a signal, based on the position of the direction switch 220, to the controller 200. As shown in FIG. 3, when the first side 260 of the direction switch 220 is fully depressed, the direction switch 220 is in a first position. When the direction switch 220 is in the first position, the mode of operation for motor 180 is in the FORWARD direction. As shown in FIG. 4, when the second side 265 of the direction switch 220 is fully depressed, the direction switch 220 is in a second position, the second position being opposite the first position. When the direction switch 220 is in the second position, the mode of operation of the motor 180 is in the REVERSE direction. As shown in FIG. 5, when the direction switch 220 is in a third position, neither the first side 260 or second side 265 is fully depressed, and the mode of operation of the motor 180 is NEUTRAL.

Figure 6:
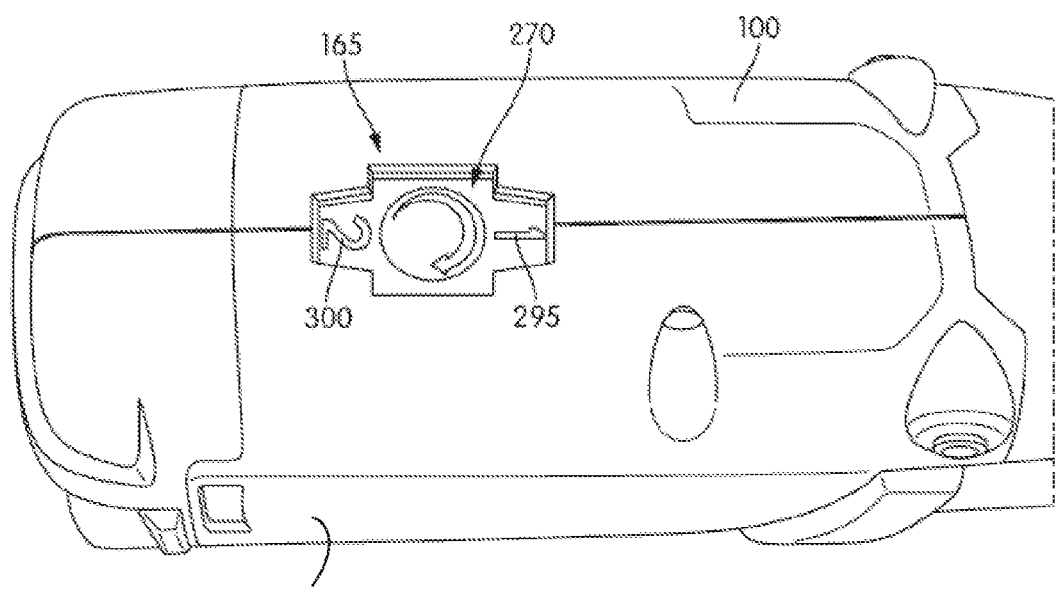
FIG. 6 illustrates a speed selector switch of the tool shown in FIG. 1.
Figure 7:
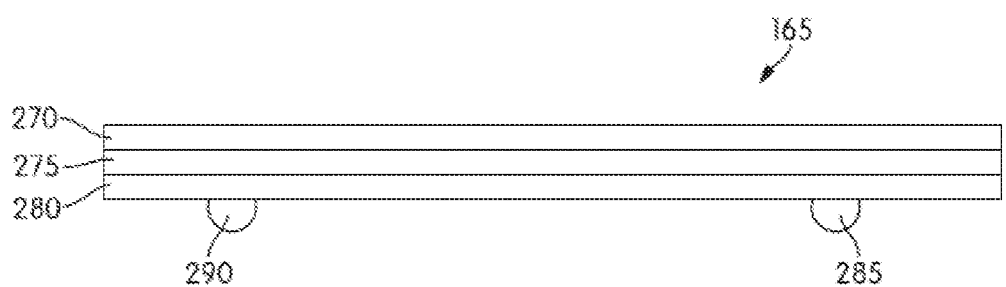
FIG. 7 illustrates a block diagram of the speed selector switch shown in FIG. 6.

As discussed above, the tool 100 includes the user mode selector switch 165, as shown in more detail in FIGS. 6 and 7 according to one embodiment. The user mode selector switch 165 is a multi-layer electrical switch including a label layer 270, a push-button 275, a printed circuit board layer 280, and light-emitting diodes (LEDs) 285, 290. The label layer 270 includes mode indicators 295, 300. Mode indicator 295 indicates to the operator, for example, that a recording mode is selected, and mode indicator 300 indicates to the operator, for example, that a playback mode is selected. When both indicators 295 and 300 are off, the normal use mode of the tool is selected. The push-button 275 is an electrical push-button, and in the illustrated embodiment, the push-button 275 is a low-profile pop-switch. In some embodiments, the printed circuit board layer 280 includes a controller having a similar construction as controller 200.

Figure 17:
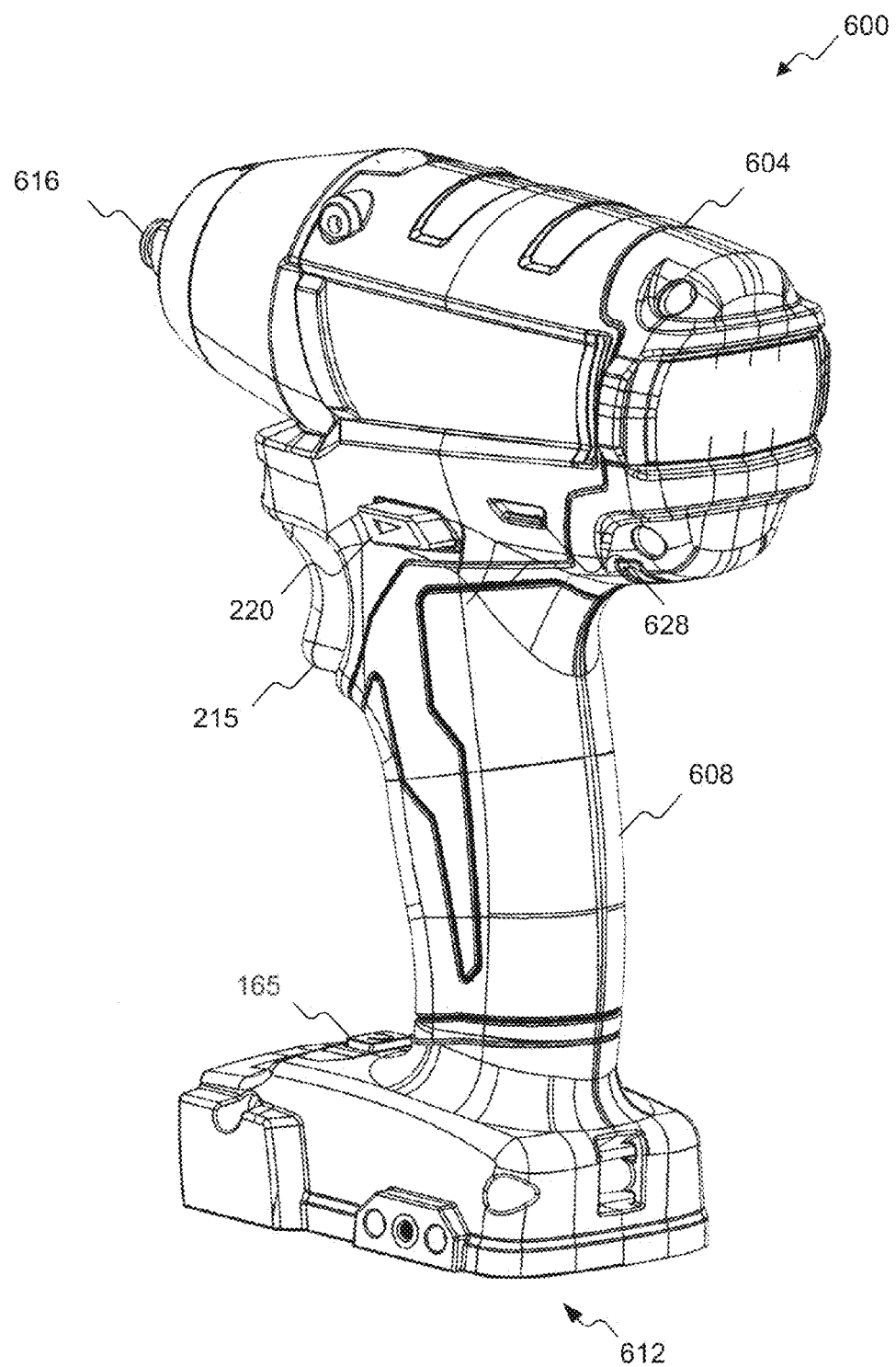
FIG. 17 is a perspective view of a tool according to another embodiment of the invention.
Figure 18:
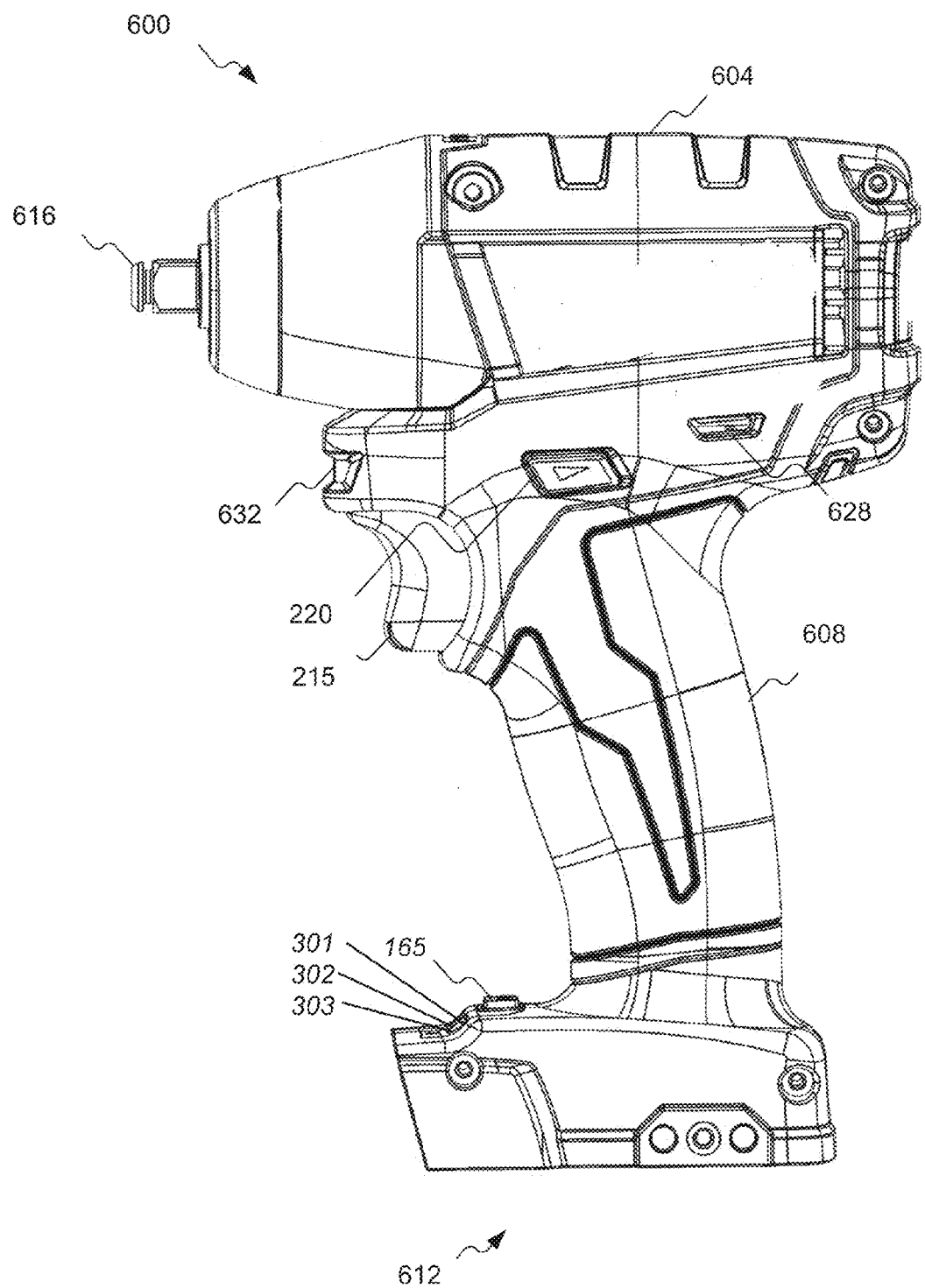
FIG. 18 is a side view of the tool shown in FIG. 17.

According to another embodiment, the user mode selector switch 165 is positioned below trigger mechanism 195 and adjacent to the battery receptacle 190 (an example of which is shown in FIGS. 17 and 18). A plurality of mode indicators 301, 302, and 303, indicate to the operator the recording, playback, and normal user modes of the tool 100. The user mode selector switch 165 may be a multi-layer electrical switch such as that described above. Alternatively, tool 100 may have a single indicator, such as indicator 301, to indicate the recording, playback, and normal user modes. The indicator may indicate the recording mode, for example, using a blinking indicator signal. The playback mode may be indicated, for example, by a constant-on indicator signal. When the indicator 301 is off, the normal user mode may be indicated. One skilled in the art will recognize that the number of indicators and the manner of their visual display according to other embodiments are within the scope of the present invention.

In operation, the user mode selector switch 165 controls the operating mode of the motor 180, via the controller 200, allowing the operator to choose between the recording, playback, and normal user modes. When the push-button 275 is pressed, the user modes are selected. The LEDs 285, 290 illuminate the mode indicators 295, 300, or indicators 301-303 are illuminated, to indicate to the operator the currently selected operating mode of the motor 180.

Figure 8:
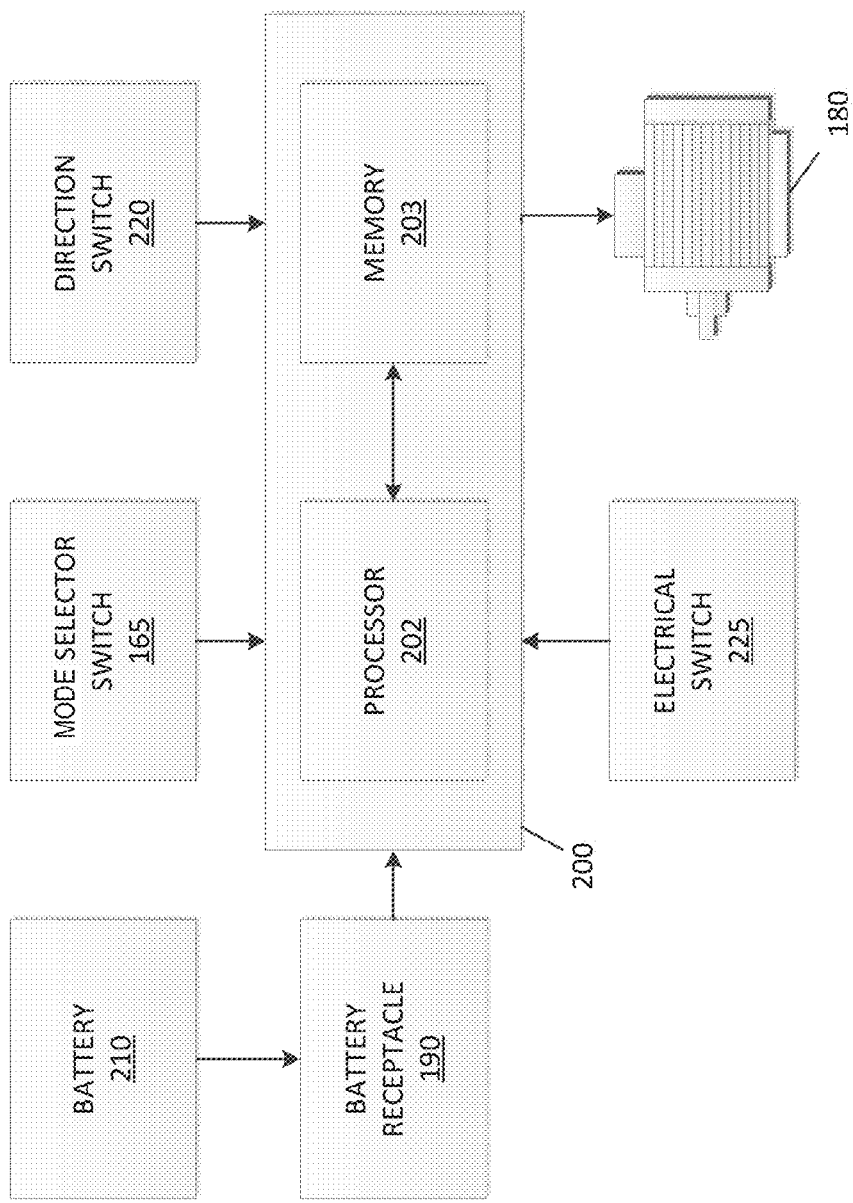
FIG. 8 is an electrical schematic diagram of the tool shown in FIG. 1, and including a controller.

FIG. 8 is an electrical schematic of the tool 100 including the controller 200. The controller 200 is electrically and/or communicatively connected to a variety of modules or components of the tool 100. For example, the controller 200 is electrically connected to the battery 210, the motor 180, the user mode selector switch 165, components of the trigger mechanism 195 (i.e., the electrical switch 225 and the direction switch 220), as well as other components of the tool 100. The controller 200 includes combinations of hardware and software that are operable to, among other things, control the operation of the tool 100. In some embodiments, the controller 200 includes electrical and electronic components that provide power, operational control, and protection to the components and modules within the controller 200 and tool 100. For example, the controller 200 includes, among other things, a processor 202 (e.g., a microprocessor, a microcontroller, or another suitable programmable device) and a memory 203.

The memory 203 includes, for example, a program storage and a data storage. The program storage and the data storage can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processor 202 is connected to the memory 203 and executes software instructions that are capable of being stored in a RAM of the memory 203 (e.g., during execution), a ROM of the memory 203 (e.g., on a generally permanent basis), or another non-transitory computer readable medium such as another memory or a disc. Software included in the implementation of the tool 100 can be stored in the memory 203 of the controller 200. The software includes, for example, firmware, one or more applications, program data, filters, rules, one or more program modules, and other executable instructions. The controller 200 is configured to retrieve from memory and execute, among other things, instructions related to the control processes and method described herein. In other embodiments, the controller 200 includes additional, fewer, or different components.

The controller 200 is electrically coupled to the user mode selector switch 165, the motor 180, the electrical switch 225 and the direction switch 220 of the trigger mechanism 195, and the battery 210, through the battery receptacle 190. The controller 200 receives signals from the electrical components of the tool 100 and controls operation of the tool 100 according to the received signals.

In one embodiment of operation, a user selects an operating mode using the user mode selector switch 165. The user mode selector switch 165 sends a first mode signal, a second mode signal, or a third mode signal to the controller 200. The user then selects a FORWARD direction, a REVERSE direction, or NEUTRAL using the direction switch 220. The direction switch 220 sends a direction signal to the controller 200. Once the user activates the trigger mechanism 195, the electrical switch 225 of the trigger mechanism 195 sends an activation signal to the controller 200. The controller operates the motor 180 upon receiving the activation signal according to the user mode that is selected.

Figure 9:
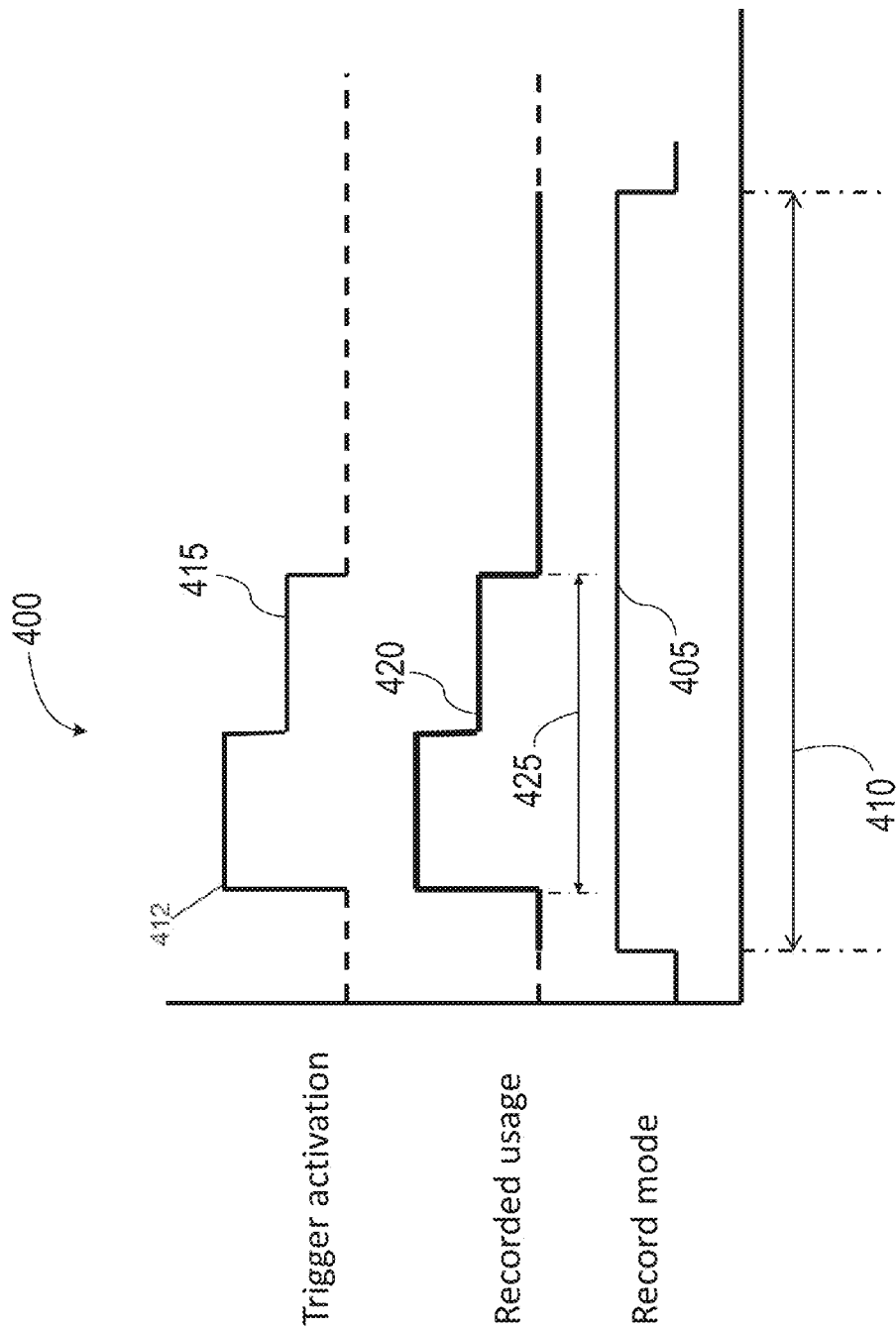
FIG. 9 is an operational schematic diagram of the tool shown in FIG. 1.

FIG. 9 illustrates a pulse diagram 400 for an operation of the controller 200 during a recording mode according to an embodiment of the invention. The controller 200 receives a user mode signal from the user mode selector switch 165 and begins the recording mode at 405. According to the embodiment illustrated in FIG. 9, the recording mode comprises a timed mode in which data from the desired motor parameter is measured and recorded from the start of the record mode until the end of the record mode, which may be a specific time period 410 or may be ended by the user changing the user mode to the playback mode or to the normal use mode. In the timed mode, data for the desired motor parameter is measured whether or not there is an activation signal from the trigger mechanism 195. Accordingly, during periods in which there is no trigger activation that causes activation of the motor, the data for the desired recorded motor parameter is measured and recorded even if the measured data results in values that do not cause activation of the motor.

As illustrated in FIG. 9, the start of record mode 405 begins recording the usage of the motor parameter prior to receiving an activation signal from the trigger assembly. When the trigger assembly is activated at 412, the motor parameter signal 415 that is changed thereby is measured and recorded during the recording of the usage. The resulting recorded motor parameter signal 420 is stored and used during playback as described herein below. The recorded motor parameter signal 420 may be stored in its entirety including the blank or null portions for which no motor control parameter was manipulated or recorded during the record mode or maybe truncated to the portion 425 for which the motor control parameter signals 415 were recorded during the record mode. The truncation may occur after recording for storage and later playback or may be truncated during the playback mode.

According to embodiments of the invention, the motor parameter signals 415 that are measured and recorded during the record mode may include PWM duty cycle (amount of trigger pull), the speed of the motor, the torque of the motor, the power to the motor, the number of impact "blows", and other motor parameters.

Figure 10:
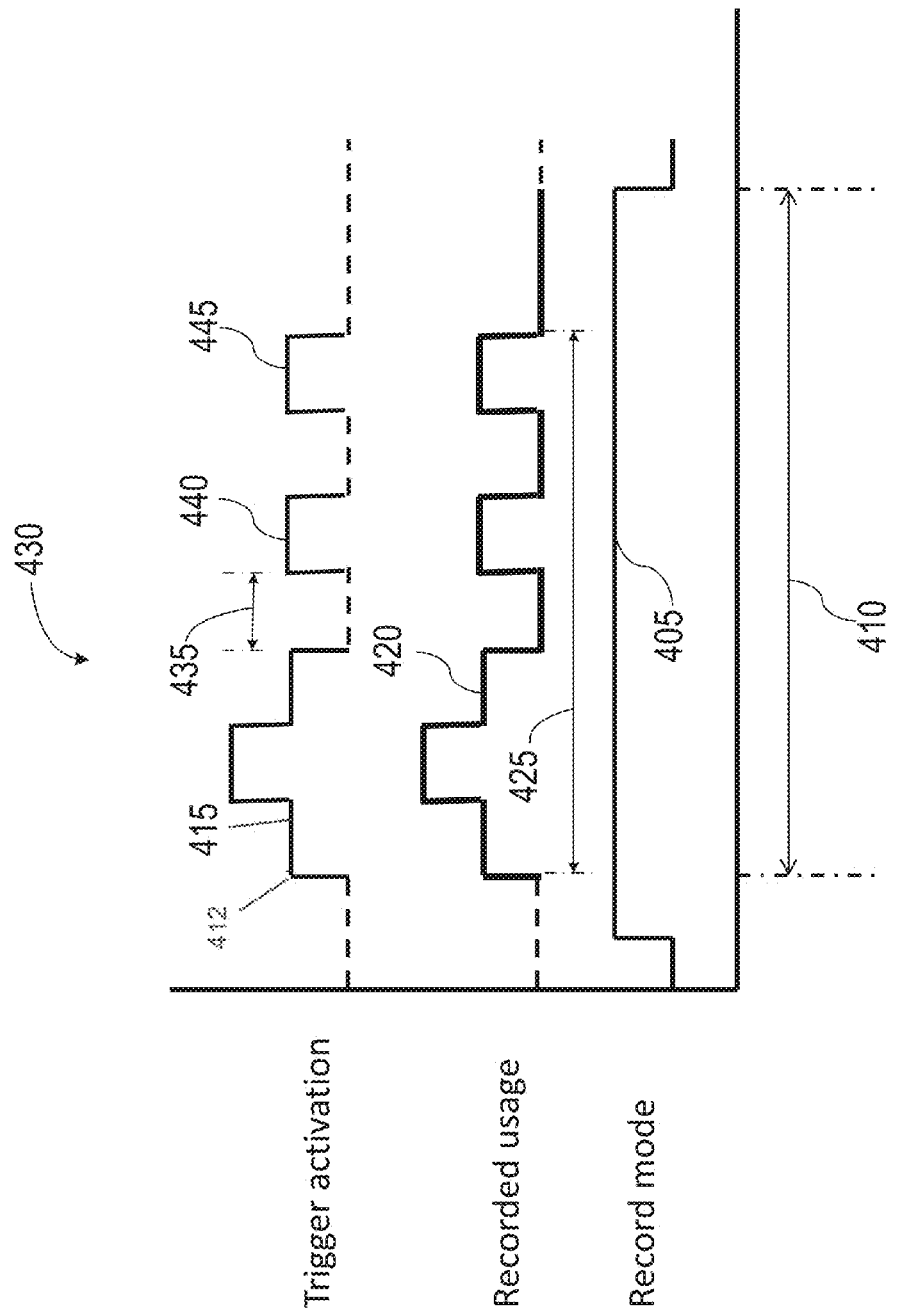
FIG. 10 is an operational schematic diagram of the tool shown in FIG. 1.

FIG. 10 illustrates a pulse diagram 430 for an operation of the controller 200 during a recording mode according to another embodiment of the invention. The controller 200 receives a user mode signal from the user mode selector switch 165 to begin the recording mode at 405, but does not begin recording the usage of the motor parameter signal 415 until activation of the trigger begins at 412. According to the embodiment illustrated in FIG. 10, the recording mode comprises a timed mode in which data from the motor parameter signal 415 is measured and recorded from the start of the trigger activation at 412 until the end of the record mode 405, which may be a specific time period 410 or may be ended by the user changing the user mode to the playback mode or to the normal use mode. In this mode, data for the motor parameter signal 415 is measured beginning from when the trigger is first activated at 412 and continues whether or not there is an activation signal from the trigger mechanism 195 until the end of the recording mode 405 (e.g., the end of the time period 410). Accordingly, during periods in which there is no trigger activation (e.g., time period 435) that causes activation of the motor once recording has begun, the data for the desired recorded motor parameter is measured and recorded even if the measured data results in values that do not cause activation of the motor.

As illustrated in FIG. 10, the start of record mode 405 begins recording the usage of the motor parameter signal 415 at the first activation of the trigger assembly at 412. When the trigger assembly is activated, the motor parameter signal 415 that is changed thereby is measured and recorded during the recording of the usage. Since recording continues after the first trigger activation at 412 even when there is no activation of the trigger (e.g., during period 435), subsequent trigger activation pulses 440 and 445 are also recorded, which may occur through a user's preference of pulsing an impact tool, for example, after seating a fastener. The resulting recorded motor parameter signal 420 is stored and used during playback as described herein below. The recorded motor parameter signal 420 may be stored in its entirety including the blank or null portions for which no motor control parameter was manipulated or recorded during the record mode or maybe truncated to the portion 425 for which motor control parameter signals 415 were recorded during the record mode 405. The truncation may occur after recording for storage and later playback or may be truncated during the playback mode.

Figure 11:
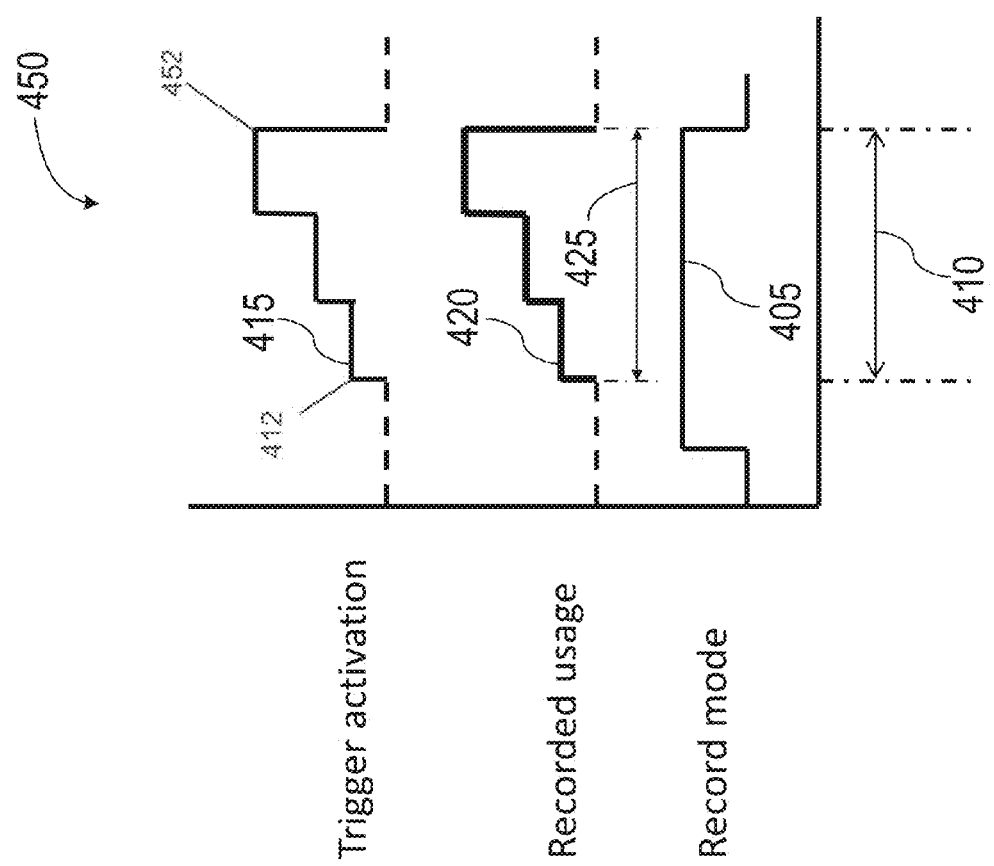
FIG. 11 an operational schematic diagram of the tool shown in FIG. 1.

FIG. 11 illustrates a pulse diagram 450 for an operation of the controller 200 during a recording mode according to another embodiment of the invention. The controller 200 receives a user mode signal from the user mode selector switch 165 to begin the recording mode at 405, but does not begin recording the usage of the motor parameter signal 415 until activation of the trigger begins at 412. According to the embodiment illustrated in FIG. 11, the recording mode comprises a trigger-recording mode in which data from the motor parameter signal 415 is measured and recorded from the start of the trigger activation at 412 until the end of the single trigger activation event at 452. In this mode, data for the motor parameter signal 415 is measured beginning from when the trigger is first activated at 412 and terminates when the activation signal from the trigger mechanism 195 is first ended at 452. Accordingly, the data for the motor parameter signal 415 is measured and recorded only during the first, single trigger activation signal.

As illustrated in FIG. 11, the start of record mode 405 begins recording the usage of the motor parameter signal 415 at the first activation of the trigger assembly at 412. When the trigger assembly is activated at 412, the motor parameter signal 415 that is changed thereby is measured and recorded during the recording of the usage. Since recording stops after the first trigger activation, subsequent trigger activation pulses are not recorded. The resulting recorded motor parameter signal 420 is stored and used during playback as described herein below.

According to an embodiment of invention, the playback mode of the tool may be automatically set and entered into at the end of the recording modes 405 illustrated in FIGS. 9-11.

Figure 12:
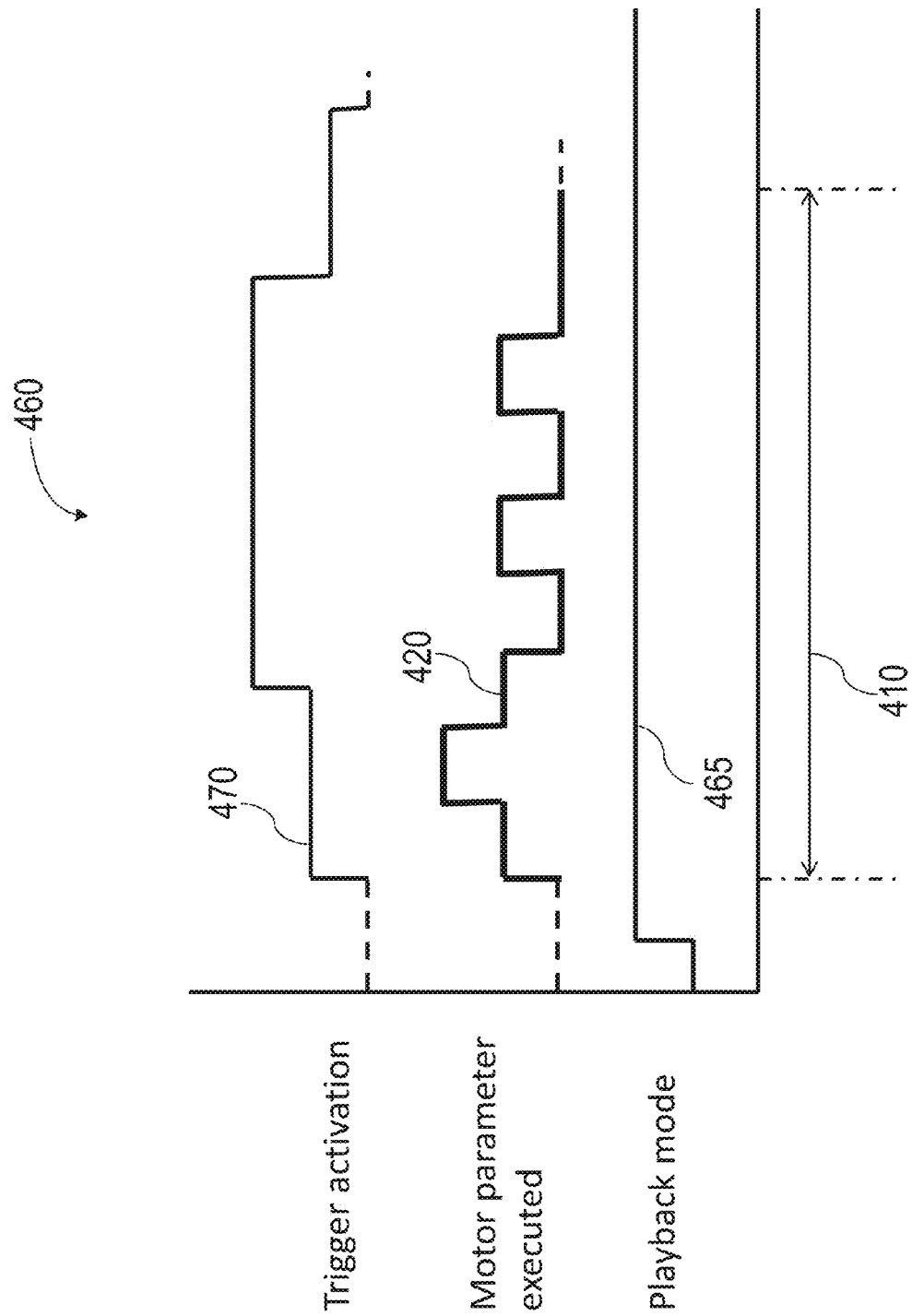
FIG. 12 an operational schematic diagram of the tool shown in FIG. 1.

FIG. 12 illustrates a pulse diagram 460 for an operation of the controller 200 during a playback mode according to another embodiment of the invention. As an example, the recorded motor parameter signal 420 of FIG. 10 is used for the pulse diagram 460 of FIG. 12. The controller 200 receives a user mode signal from the user mode selector switch 165 to begin the playback mode 465 but does not begin executing the recorded motor parameter signal 420 until activation of the trigger begins at 470.

As illustrated, activation of the trigger at 470 begins execution (or playback) of the recorded motor parameter signal 420 according to what was recorded and stored during the recording mode 405 of pulse diagram 430. While the trigger activation pulse 470 does not match the executed recorded motor parameter signal 420, execution of the recorded motor parameter signal 420 allows for repeatability of the recorded parameter even when the trigger activation signal 470 does not match. Accordingly, a different trigger activation signal profile nevertheless causes the recorded motor parameter signal 420 to be executed. In this manner, the recorded motor parameter signal 420 may be reliably repeated for tasks such as motor line assembly scenarios or other such tasks where predictability of tool use is desired. As illustrated, when the recording time period 410 is ended, the executed recorded motor parameter signal 420 is also ended, and even though trigger activation signal 470 illustrates that the trigger mechanism 195 is still being activated, the tool motor is not activated since the recorded motor parameter signal 420 has ended. The recorded motor parameter signal 420 is not executed again until re-activation of the trigger mechanism 195 a subsequent time during playback mode 465 in one embodiment.

According to another embodiment of the invention, the recorded motor parameter signal 420 is repeatedly executed as long as the trigger mechanism 195 is activated. In this manner, for example, a recorded parameter signal (e.g., the recorded motor parameter signal 420) that oscillates the motor parameter between two or more values may continue to oscillate the motor parameter for a longer duration of the trigger activation. As such, a short recorded signal may be extended and be executed many times repeatedly during a long trigger activation time.

Figure 13:
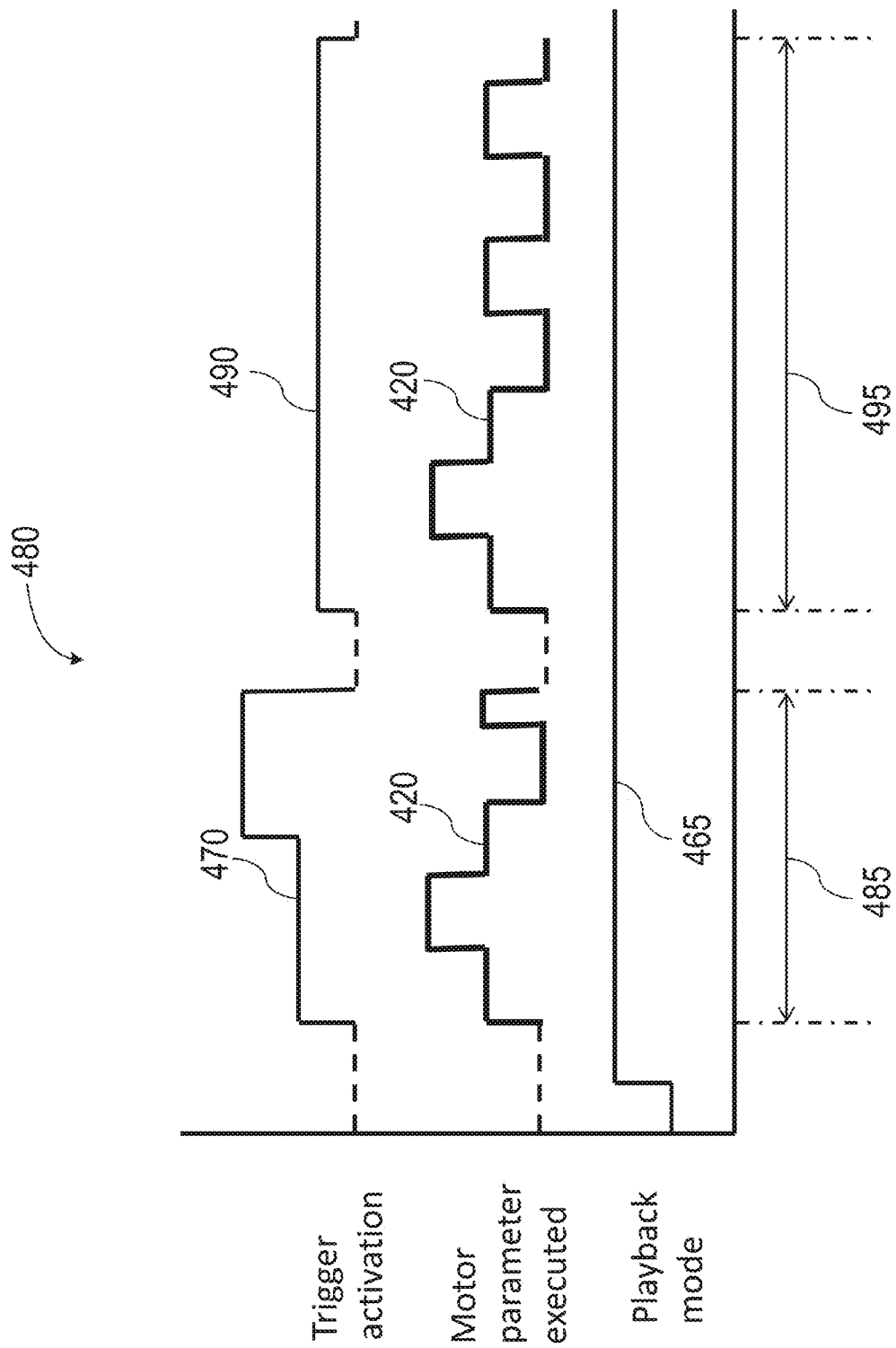
FIG. 13 an operational schematic diagram of the tool shown in FIG. 1.

FIG. 13 illustrates a pulse diagram 480 for an operation of the controller 200 during a playback mode according to another embodiment of the invention. As an example, the recorded motor parameter signal 420 of FIG. 10 is used for the pulse diagram 480 of FIG. 13. The controller 200 receives a user mode signal from the user mode selector switch 165 to begin the playback mode 465 but does not begin executing the recorded motor parameter signal 420 until activation of the trigger begins at 470.

As illustrated, however, at the end of a first trigger activation time 485 that may be caused, for example, by the user releasing the trigger mechanism 195, playback of the recorded motor parameter signal 420 is halted when the trigger mechanism 195 is released. When the trigger mechanism 195 is re-activated during a subsequent trigger activation signal 490, the recorded motor parameter signal 420 is played back from the beginning during a second trigger activation time 495 even though it was halted during the previous execution. In this manner, playback of the recorded motor parameter signal 420 is re-initiated from the beginning each time the trigger mechanism 195 is re-activated.

Figure 14:
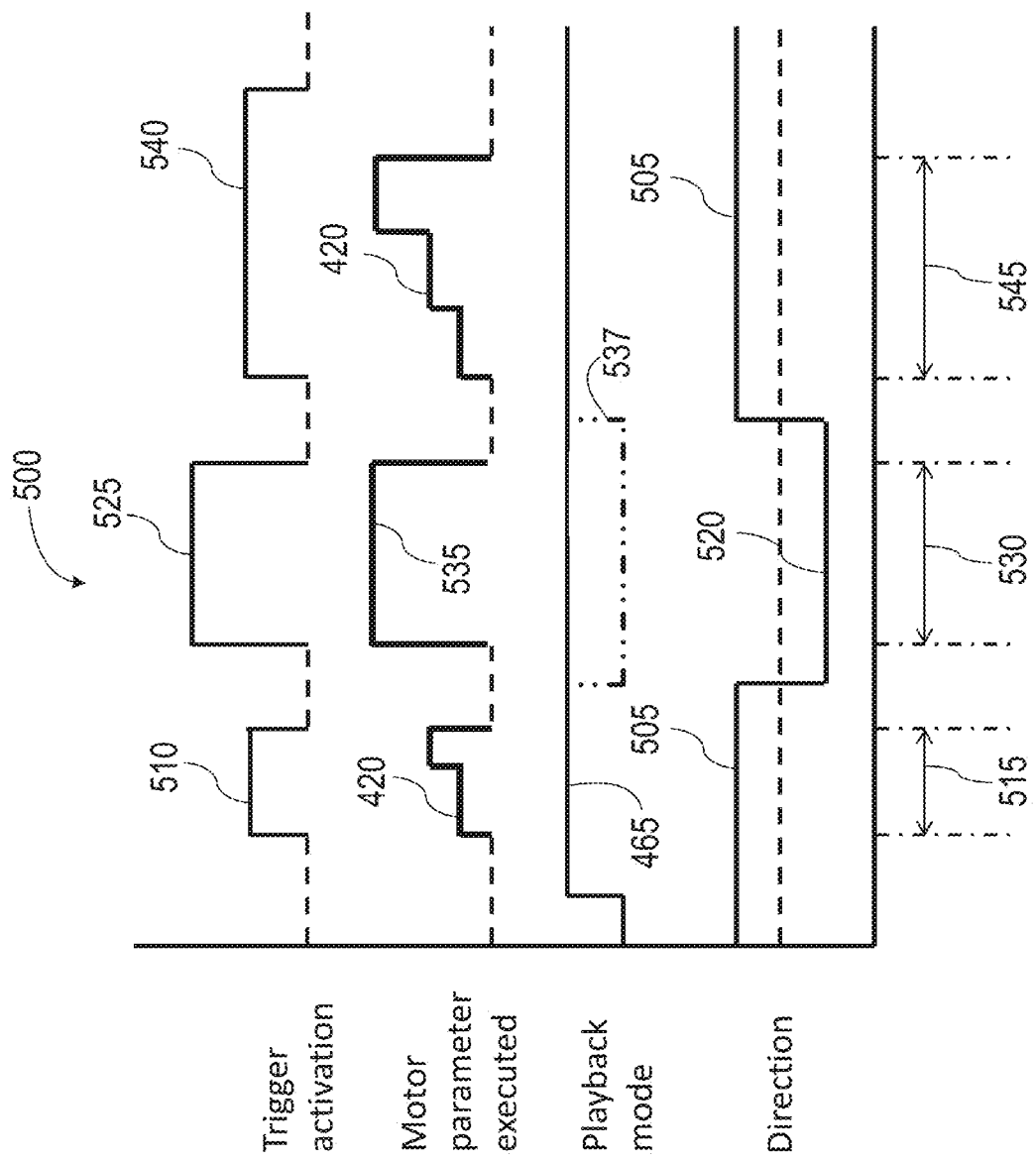
FIG. 14 an operational schematic diagram of the tool shown in FIG. 1.

FIG. 14 illustrates a pulse diagram 500 for an operation of the controller 200 during a playback mode according to another embodiment of the invention. As an example, the recorded parameter signal 420 of FIG. 11 is used for the pulse diagram 500 of FIG. 14. The controller 200 receives a user mode signal from the user mode selector switch 165 to begin the playback mode 465 but does not begin executing the recorded motor parameter signal 420 until activation of the trigger begins at 510. A direction signal from the direction switch 220 illustrates that the tool is in a forward mode direction 505 at the beginning of the playback mode 465.

Similar to that illustrated in FIG. 12, at the end of a first trigger activation time 515 that may be caused, for example, by the user releasing the trigger mechanism 195, playback of the recorded motor parameter signal 420 is halted when the trigger mechanism 195 is released. For example, the user may stop the trigger activation 510 in order to switch the direction switch 220 to the reverse direction mode 520 in order to engage a fastener to back it out of its current position prior to re-engaging the fastener to drive it forward. During the reverse mode 520, the recorded motor parameter signal 420 is not executed, but instead, the trigger activation signal 525 at a time 530 controls the motor according to a normal operating mode such that the motor parameter signal 535 executed during the reverse mode 520 directly corresponds with the trigger activation signal 525. While playback mode 465 is illustrated as continuing to be active throughout the direction change into the reverse mode 520, playback mode 465 may be deactivated as illustrated in phantom at 537 while the reverse mode 520 is engaged. When the forward mode 505 is re-engaged via direction switch 220 and the trigger mechanism 195 is re-activated during a subsequent trigger activation signal 540, the recorded motor parameter signal 420 is played back from the beginning during a second trigger activation time 545 even though it was halted during the previous execution. In this manner, playback of the recorded motor parameter signal 420 is re-initiated from the beginning each time the trigger mechanism 195 is re-activated.

Figure 15:
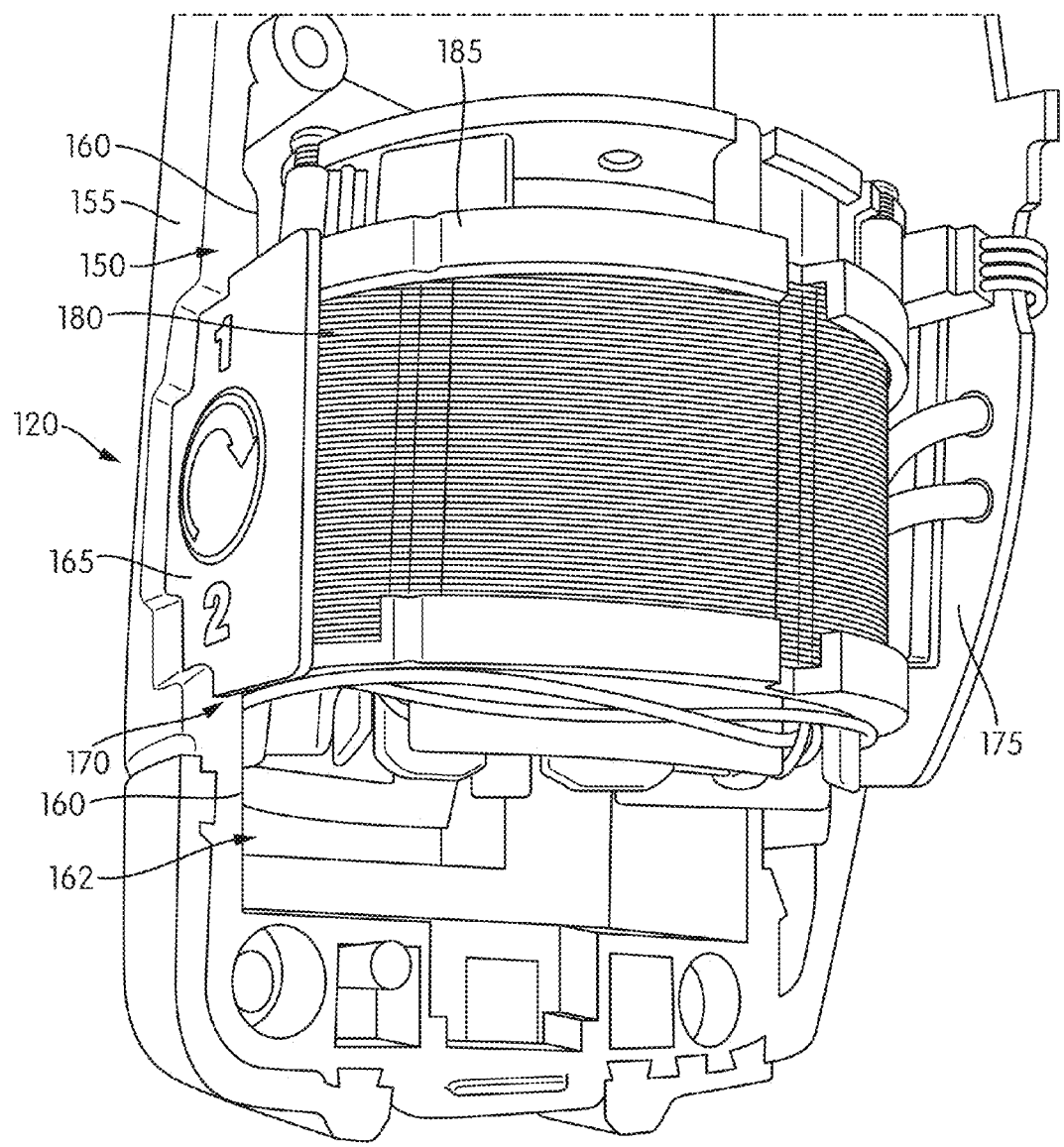
FIG. 15 is a perspective view of the tool shown in FIG. 1 with the tool housing removed.

Referring to FIG. 15, in the illustrated embodiment, the user mode selector switch 165 is located within the pocket 170 proximate to the motor 180 and accessible from the top surface 120 of the tool housing 105. The compact design of the user mode selector switch 165 allows it to be placed in the relatively small space above the motor 180. Further, the lightweight design of the user mode selector switch 165 adds little weight to the tool 100.

Figure 16:
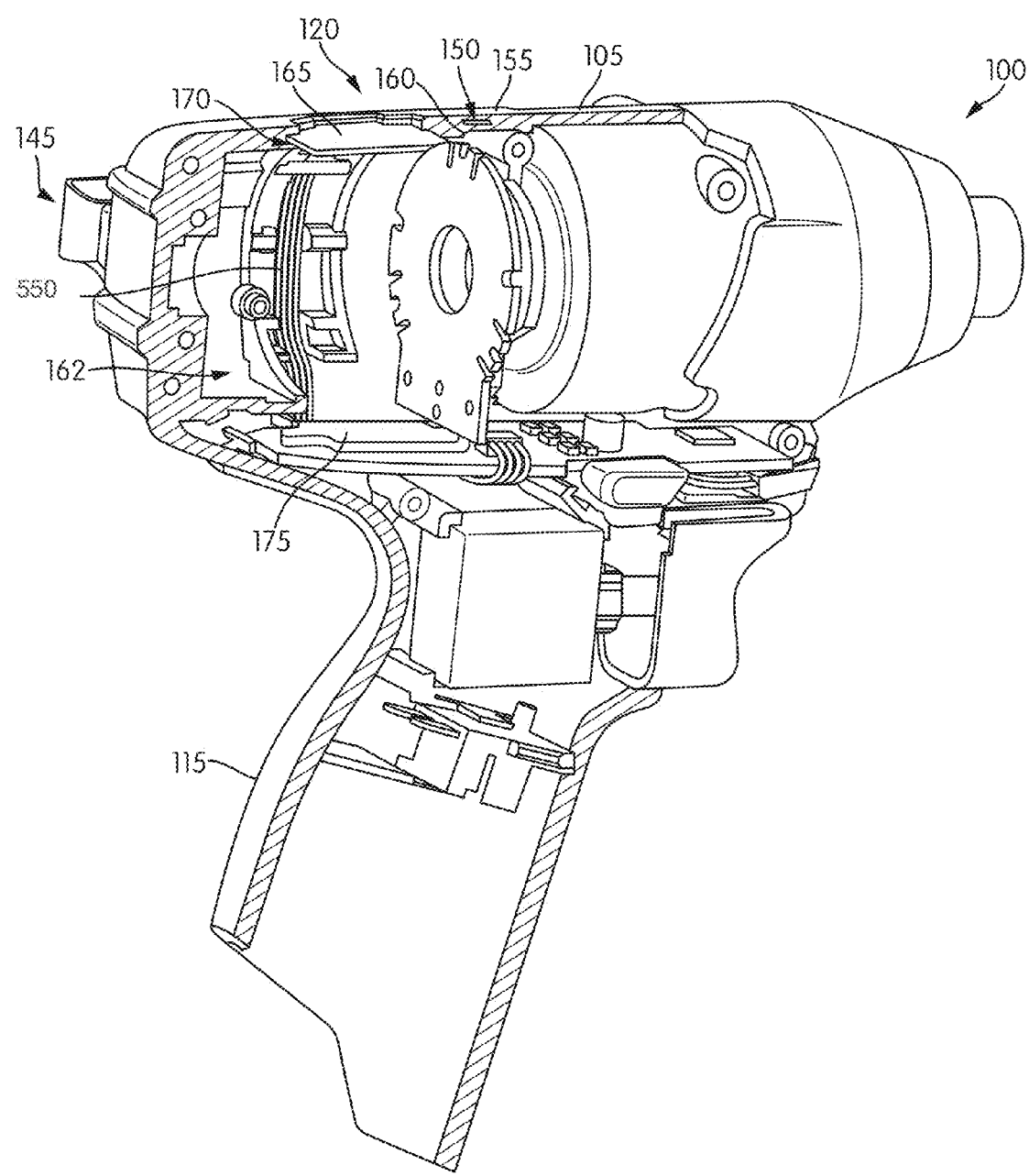
FIG. 16 is a perspective view of the tool shown in FIG. 1 with a motor and a portion of the tool housing removed.

As shown in FIG. 16, with the motor 180 removed for viewing purposes, wires 550 for the user mode selector switch 165 run along a side of the interior surface 160 of the body portion 110 and electrically couple the user mode selector switch 165 to the PCB 175.

The cordless, hand-held power tool illustrated in FIGS. 17-18 is an impact wrench 600. The impact wrench 600 includes an upper main body 604, a handle portion 608, a battery pack receiving portion 612, user mode selector switch(es) 165, mode indicators 301-303, an output drive device or mechanism 616, a forward/reverse selection button 220, a trigger 215, and air vents 628. The impact wrench 600 also includes a worklight 632. The battery pack receiving portion 612 receives a portion of a battery pack and includes a terminal assembly including a plurality of terminals. The number of terminals present in the receiving portion 612 can vary based on the type of hand-held power tool. However, as an illustrative example, the receiving portion 612 and the terminal assembly can include a battery positive ("B+") terminal, a battery negative ("B−") terminal, a sense or communication terminal, an identification terminal, etc. The outer portions or housing of the impact wrench 600 (e.g., the main body 604 and the handle portion 608) are composed of a durable and light-weight plastic material. The drive mechanism 616 is composed of a metal (e.g., steel) as is known in the art.

The battery positive and battery negative terminals are operable to electrically connect the battery pack to the hand-held power tool and provide operational power (i.e., voltage and current) for the hand-held power tool from the battery pack to the hand-held power tool. The sensor or communication terminal is operable to provide for communication or sensing for the hand-held power tool of the battery pack. For example, the communication can include serial communication or a serial communication link, the transmission or conveyance of information from one of the battery pack or the hand-held power tool to the other of the battery pack or hand-held power tool related to a condition or characteristic of the battery pack or hand-held power tool (e.g., one or more battery cell voltages, one or more battery pack voltages, one or more battery cell temperatures, one or more battery pack temperatures, etc.).

The identification terminal can be used by the battery pack or the hand-held power tool to identify the other of the battery pack or the hand-held power tool. For example, the hand-held power tool can identify the battery pack as a high capacity battery pack or a normal capacity battery pack, as a lithium-based battery or a nickel-based battery, as a battery pack having a particular voltage (described below), a higher resistance battery pack, a lower resistance battery pack, etc. Additionally or alternatively, the battery pack can identify the hand-held power tool as a hammer drill, a drill/wrench, an impact wrench, an impact wrench, a brushless power tool, a brushed power tool, a higher resistance power tool (e.g., capable of lower power output), a lower resistance power tool (e.g., capable of higher power output), etc.

One of skill in the art will recognize that embodiments of the invention may be incorporated into tools such as power drills, impact drivers, power saws, angle drivers, and other tools incorporating a user-activated trigger mechanism. One skilled in the art will also recognize that the trigger activation signals, while illustrated as being discrete steps, are merely examples and that other continuous types of trigger activation signals are contemplated herein.

Thus, the invention provides, among other things, a power tool including a speed selector switch for selecting an operating speed of the power tool. Various features and advantages of the invention are set forth in the following claims.

What is claimed is:

1. A power tool comprising:
a tool housing defining a cavity;
a motor positioned within the cavity;
a trigger coupled to the tool housing, the trigger configured to output an activation signal based on a user input; and
a controller coupled to the trigger and the motor, the controller configured to
receive a mode selection signal indicative of a user mode selection for the power tool,
enter a recording mode when the user mode selection indicates the recording mode,
record a motor parameter while the power tool is in the recording mode and the motor is operating to generate a recorded motor parameter, wherein, to generate the recorded motor parameter, the controller is further configured to:
generate a first portion of the recorded motor parameter by recording the motor parameter during a first time period in which the motor is operating in response to depression of the trigger,
generate a second portion of the recorded motor parameter by recording the motor parameter during a second time period in which the motor is inactive in response to release of the trigger, wherein the second time period follows the first time period, and
truncate the recorded motor parameter to the first portion;
enter a playback mode when the user mode selection indicates the playback mode, and
operate the motor based on the recorded motor parameter upon receiving the activation signal from the trigger while the power tool is in the playback mode.

2. The power tool of claim 1, wherein the controller is configured to enter a normal operating mode when the user mode selection indicates the normal operating mode, and
control a current supplied to the motor corresponding to the activation signal from the trigger while the power tool is in the normal operating mode.

3. The power tool of claim 1, wherein the motor parameter includes one of a duty cycle indicating trigger pull, a motor speed, a motor torque, a motor power, and a number of impact activations.

4. The power tool of claim 1, wherein the controller is configured to begin to record the motor parameter for a predetermined time period upon entering the recording mode.

5. The power tool of claim 1, wherein, after entering the recording mode, the controller is configured to begin to record the motor parameter of the power tool upon receiving the activation signal from the trigger.

6. The power tool of claim 1, wherein, while in the recording mode, the controller is configured to record the motor parameter until the user mode selection indicates a change in an operating mode of the power tool.

7. The power tool of claim 1, wherein the trigger moves between a depressed state, in which the trigger outputs the activation signal, and a released state, in which the trigger does not output the activation signal, and wherein, while in the playback mode, the controller is configured to operate the motor based on the recorded motor parameter when the trigger is in the depressed state.

8. The power tool of claim 7, wherein the recorded motor parameter has a duration, and wherein, while the power tool is in the playback mode and the trigger is in the depressed state, the controller is configured to stop operating the motor based on the recorded motor parameter when the duration ends.

9. The power tool of claim 7, wherein while the power tool is in the playback mode, the controller is configured to repeat playback of the recorded motor parameter, by repeating operation of the motor based on the recorded motor parameter, until the trigger changes from the depressed state to the released state.

10. The power tool of claim 1, further comprising a mode indicator for indicating an operating mode of the power tool to a user.

11. The power tool of claim 1, further comprising a direction switch switchable between a first direction and a second direction, the direction switch configured to indicate a desired motor direction, and wherein the controller is further configured to switch from the playback mode to the normal operating mode when the direction switch is switched.

12. A method of operating a power tool including a motor, a mode selector switch, a trigger, and a controller, the method comprising:
receiving, by the mode selector switch, a user mode selection indicating an operating mode for the power tool, the operating mode selected from the group of a recording mode, a playback mode, and a normal operating mode;
entering, by the controller, the recording mode when the user mode selection indicates the recording mode,
recording, by the controller, a motor parameter while the power tool is in the recording mode and the motor is operating to generate a recorded motor parameter, wherein generating the recorded motor parameter includes:
generating a first portion of the recorded motor parameter by recording the motor parameter during a first time period in which the motor is operating in response to depression of the trigger, generating a second portion of the recorded motor parameter by recording the motor parameter during a second time period in which the motor is inactive in response to release of the trigger, wherein the second time period follows the first time period, and truncating the recorded motor parameter to the first portion:

entering, by the controller, the playback mode when the user mode selection indicates the playback mode;

receiving, by the controller, an activation signal from the trigger; and executing, by the controller, the recorded motor parameter to operate the motor based on the recorded motor parameter upon receipt of the activation signal while the power tool is in the playback mode.

13. The method of claim 12, further comprising entering, by the controller, the normal operating mode when the user mode selection indicates the normal operating mode; and controlling a current, by the controller, supplied to the motor corresponding to the activation signal from the trigger while the power tool is in the normal operating mode.

14. The method of claim 12, wherein generating the recorded motor parameter includes recording the motor parameter for a predetermined amount of time after receiving the activation signal from the trigger while in the recording mode.

15. The method of claim 12, wherein generating the recorded motor parameter includes recording the motor parameter for a predetermined amount of time upon entering the recording mode.

16. The method of claim 12, further comprising entering the playback mode automatically when the recording of the motor parameter ends.

17. The method of claim 12, wherein the recorded motor parameter covers a first time period in which the motor is operating in response to depression of the trigger, a second time period in which the motor is inactive in response to release of the trigger, and a third time period in which the motor is operating in response to another depression of the trigger.

18. The method of claim 12, further comprising switching, by the controller, between the playback mode and the normal operating mode based on a switching of a motor direction switch.

* * * * *